Figures 1, 2:
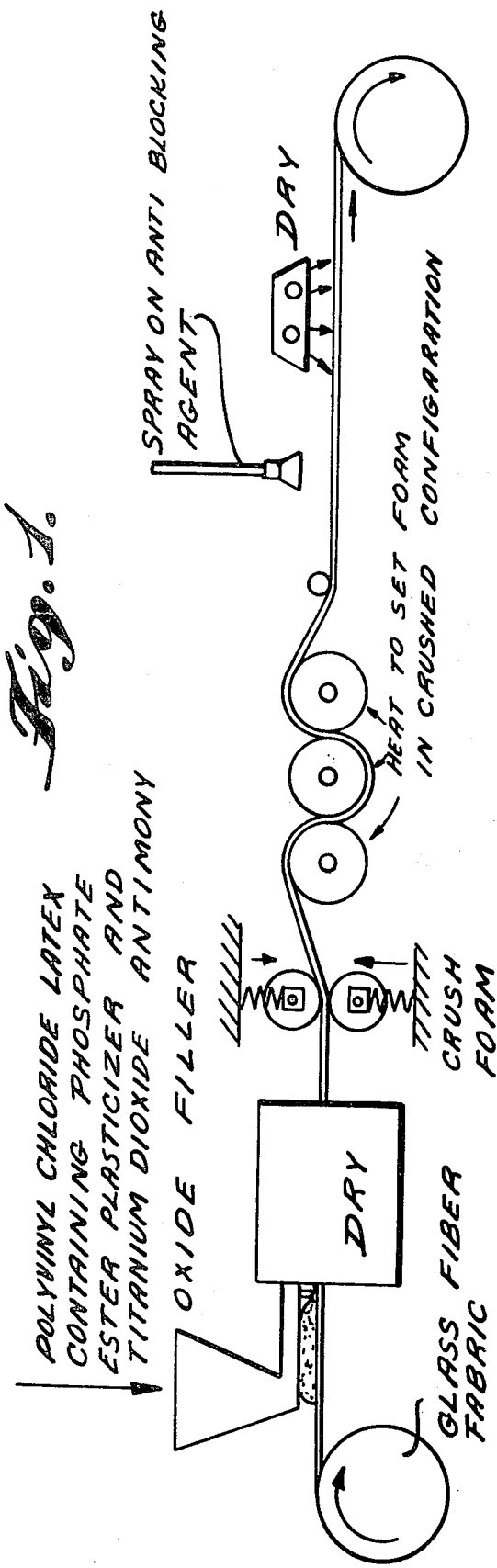

United States Patent

[11] 3,615,970

| [72] | Inventor | Robert E. May |
| | | Greensboro, N.C. |
| [21] | Appl. No. | 790,448 |
| [22] | Filed | Jan. 10, 1969 |
| [45] | Patented | Oct. 26, 1971 |
| [73] | Assignee | Burlington Industries, Inc. |
| | | Greensboro, N.C. |

[54] GLASS FIBER FABRIC FOR DRAPERY
8 Claims, 2 Drawing Figs.

[52] U.S. Cl. .................................... 156/78, 156/198
[51] Int. Cl. ........................................ B32b 5/18
[50] Field of Search ............................. 156/78, 198, 311

[56] References Cited
UNITED STATES PATENTS
| 2,752,279 | 6/1956 | Alderfer | 156/78 |
| 2,894,918 | 7/1959 | Killoran et al. | 156/78 |
| 3,007,205 | 11/1961 | House | 156/78 X |

OTHER REFERENCES
Belgian Patents Report No. 20/68 P.2— Abstract of Belgium Patent No. 706518 filed 11/14/1967

*Primary Examiner*—Carl D. Quarforth
*Assistant Examiner*—S. R. Hellman
*Attorney*—Cushman, Darby & Cushman ABSTRACT: A foam-laminated glass fabric is produced by forming a layer of foam vinyl chloride polymer on one side of a glass fabric, the layer being in the form of foam latex containing plasticizer for the polymer comprising flame retardant phosphate ester and polyethylene glycol bis 2-ethyl-hexoate. The latex is dried to below its normal equilibrium water content, and then the laminate is compressed and heated briefly to set the foam in its compressed configuration. The fabric is useful in the manufacture of drapery.

INVENTOR
ROBERT E. MAY

GLASS FIBER FABRIC FOR DRAPERY

The present invention relates to a laminated fabric and more specifically to glass fiber fabric suitable for draperies having a layer of flexible polymeric foam material adhered to one side thereof.

Draperies customarily are made from one or more layers of textile fabric. A typical drapery is a rectangular piece of fabric whose edges are folded back and hemmed. At the top of the drapery, it is customary to provide pleats, which improve the appearance. A drapery made from a single layer of textile material is less expensive than a lined drapery, but if suffers from the difficulty that it is not fully opaque and that sunlight can cause fading of dyes. A lined drapery normally is composed of a relatively high quality fabric which is printed or in some other way carries a design, and a lining which is a less expensive plain woven fabric. The lining is turned outwardly, that is, toward the window in front of which the drapery hangs. The lining reduces the amount of light shining through the drapery and the amount of sunlight to which the inner or more expensive layer is exposed. This improves the light fastness of the coloring material in the inner layer. The lining also adds opacity to the drape and makes it more difficult for outsiders to see inside the window. Moreover, the lining improves the heat insulating properties of the drapery by trapping air between it and the outer layers, and it adds weight to the drapery so that it hangs better. However, lined draperies are more expensive because of the cost of the lining fabric and also the cost of the sewing it to the facing fabric. It previously has been proposed to coat the back of drapery fabrics with solid plastics or synthetic resins such as cross-linked acrylic polymers. However, an adequate thickness of polymer is too heavy and too expensive.

In the application of Jones et al. Ser. No. 651,478 filed July 6, 1967, now U.S. Pat. No. 3,527,654, (the disclosure of which is incorporated herein by reference) there is described a drapery which is composed of a textile fabric having a foam polymeric material laminated to and in intimate contact with its reverse side. The foam-laminated fabric is supplied to the drapery manufacturer with the foam in place, so that it can be applied inexpensively to continuous lengths of fabrics during manufacture. This eliminates the need for sewing a lining to the facing fabric when the fabric is converted to a drapery. The drapery and foam lining in laminate form are cut at the same time thus eliminating a separate cutting operation for the lining. The laminate also offers the advantage of not having to have an inventory of lining fabric on hand during the manufacturing operation. The foam increases the opacity of the fabric more effectively than a lightweight lining fabric and possesses all of the other advantages of a lining. In addition, because of its low specific gravity, it adds more bulk for a given weight than a lining. Another major advantage of the laminate is that since the fabric and the foam are in intimate contact, the product is truly washable and dry cleanable and there is no danger of shrinkage or distortion of the drapery or lining material.

Glass fiber fabrics are among those which can be utilized in accordance with the aforesaid application. However, a problem is created when those fabrics are used, both because of difficulties with adhesion and also because the fire-resistant properties of the glass fabric are not possessed by the foam backings.

In accordance with the present invention, there is provided a glass fiber fabric having a foam backing layer and having improved durability and fire resistance. The foam backing layer is a foamed polymer of vinyl chloride made from a vinyl chloride polymer plastisol containing a flame-retardant plasticizer and a novel combination of solid fillers.

The invention also provides in one aspect for improved properties in the foam backing and greater ease of manufacturing. In this embodiment the foam backing is given a softer hand by means of a high molecular weight plasticizer, preferably polyethylene glycol di-2-ethyl hexoate. This plasticizer, in providing greater softening, also simplifies the manufacturing procedure, i.e., in the steps employed to eliminate non-recoverable compressibility of the foam layer.

Reference is made to Belgian Pat. No. 706,518 which describes a process for applying a foamed plastic layer to a fabric in which an aqueous emulsion is formed and applied. The emulsion is partly—but not completely—dried, the foam is crushed and then hardened by further heating. An essential feature of this process is that the emulsion must be dried to a controlled degree of moisture before crushing. This may make production conditions somewhat more critical than desirable and also creates a risk of sticking to the crushing rolls. Also, substantial heating after crushing becomes necessary.

In accordance with one feature of the present invention, the foam is made from an aqueous latex of preplasticized vinyl chloride polymer, the latex containing additional plasticizer, and before crushing, the foam layer is substantially dried, ordinarily beyond the normal equilibrium water content. After drying, the foam layer is compressed. It has been found that unless it is compressed, it retains a degree of compressibility and indentations may be formed, e.g. during sewing or handling. While the foam may recover slowly, the product may become unsightly because of such depressions. Therefore, this compressibility is removed by compression after the drying step. Then, because the foam would recover slowly after compression, the foam is heated, briefly, to set it in the compressed configuration.

The invention will be understood better from the following detailed description, reference being made to the drawing in which:

FIG. 1 is a schematic view showing various steps carried out in the process of the present invention; and FIG. 2 is a cross section through the product of the present invention.

The glass fiber fabrics used are woven, knitted, or nonwoven fabrics, most commonly woven, composed of yarn made of glass fibers or filaments, or in the case of nonwovens, discrete glass fibers.

The term glass used above refers to the commonly known amorphous inorganic, usually transparent or translucent substances consisting of silica, silicates borates and/or phosphates obtained by fusion and which cools from the fused state essentially without crystallization. The following are a few of the many types of glass which can be made into useful fibers.

| Composition | "E" Glass | "S" Glass | Quartz | Refrasil |
|---|---|---|---|---|
| $SiO_2$ | 54.5 | 65.0 | 99.97 | 98.55 |
| $B_2O_3$ | 8.5 | | | 0.200 |
| $Al_2O_3$ | 14.5 | 25.0 | 0.015 | 0.450 |
| MgO | 4.5 | 10.0 | | 0.030 |
| CaO | 17.0 | | 0.0032 | 0.200 |
| $TiO_2$ | trace | | | 0.300 |
| $Fe_2O_3$ | trace | | 0.001 | 0.120 |
| $K_2O$ | trace | | | |
| $Na_2O$ | trace | | 0.0022 | 0.150 |

The foam backing is comprised of vinyl chloride polymer. As used herein, that term refers to poly vinyl chloride or addition polymers containing a large proportion of vinyl chloride with other ethylenically unsaturated monomers which are copolymerizable with vinyl chloride, such as vinyl acetate. In general, only small amounts of such comonomers are used. However, fairly substantial quantities of internal plasticizers such as vinyl stearate or 2-ethyl hexyl acrylate may be used in lieu of corresponding amounts of external plasticizers. For example, the polymer may contain 30–50 percent an internal plasticizer.

The polymer in the preferred embodiment is used with a plasticizer in the form of an aqueous emulsion. Such a dispersion, sometimes referred to as a latex, contains the polymer, if necessary emulsifiers commonly used in polyvinyl chloride latices, plasticizers, fillers, a water-soluble surface-active agent, and if necessary, additional foam stabilizers.

The polymer is dispersed in the latex in the form of small particles, which preferably contain a portion of the plasticizer. The polymer may be internally plasticized, as mentioned above, and/or the particles may contain quantities of monomeric or polymeric plasticizers for polyvinyl chloride. This use of preplasticized polymer particles accelerates the incorporation of additional plasticizer into the polymer and the formation of film from the particles when the foam layer is dried.

In addition to internal plasticizers mentioned above, the plasticizers used either in the preplasticized polymer or in the latex are those commonly employed for polyvinyl chloride. A large variety of suitable plasticizers are known, and reference is made to Modern Plastics Encyclopedia for 1968, pages 459–472, for a description of them. The choice of plasticizers and the exact proportion used will be determined in accordance with the exact physical properties desired. However, in accordance with the present invention, there is included a flame retardant phosphate ester. The particularly preferred phosphate is tricresyl phosphate. However, others which may be used include cresyl diphenyl phosphate, triphenyl phosphate and tri-2-ethylhexyl phosphate. The amount used is about 15 to 30 percent based on the weight of the dry 100 percent vinyl chloride polymer. Also, in accordance with the preferred embodiment, there is used a high molecular weight plasticizer preferably an ester of a glycol with a higher acid. Particularly preferred is a liquid diester of polyethylene glycol with 2-ethyl-hexoic acid. An especially preferred material has the following properties: Specific gravity 0.9892 at 20° C., a refractive index of 1.4770 at 20° C., a flash point of 395° F., a boiling point of 218° C., and a pour point of −55° C. The amount used is about 20 to 40 percent based on the weight of vinyl chloride polymer. Other external plasticizers may constitute 5 to 15 percent of the polymer by weight, the exact amount depending on the properties desired.

The filler used is a mixture of titanium dioxide and antimony oxide. The filler performs several important functions. First it serves as an extender, reducing the amount of more costly polymer used. Secondly, it increases the opacity of the foam layer. Third, it reduces the tackiness of the polymer. Fourthly, it affects the stiffness of the foam, and, furthermore, it reduces the fire hazard, in combination with the phosphate plasticizer. In general, the amounts used are, based on the weight of polymer, 15 to 30 percent antimony oxide and 50 to 75 percent titanium dioxide.

The latex also contains a water-soluble surface-active agent. This material helps in the formation of a stable foam in a mechanical foamer. The preferred materials are salts of higher fatty acids, the stearates being particularly preferred. Common slats may be used, especially the salts with alkali metals, ammonia, and amines. Potassium stearate is particularly preferred. The amount used is about 5 to 15 percent by weight of the polymer.

In some cases, it may also be desirable to add water swellable thickeners to increase viscosity to prevent settling of solids from the latex and assist in foaming. Suitable materials are alkali metal salts of polyacrylic acid and methylcellulose. The amount is determined by the viscosity required to prevent settling, for example, about 1,000 centipoises.

The latex is formed usually by adding the various materials to commercially available vinyl chloride polymer latex containing preplasticized vinyl chloride polymer. The total solids in the latex is selected to meet the needs of available foaming and coating equipment, but ordinarily will be in the range of 40–80 percent by weight. It is foamed, preferably mechanically, using conventional means and the foam is applied to the glass fabric by conventional foam coating techniques. However, in some cases, chemical blowing agents may be used. The quantity of foam applied is variable, but ordinarily it is sufficient to give a dry weight of 1 to 3 ounces per square yard.

After application, the fabric is dried usually in an oven. Typical oven temperatures are 200°–400° F. with dwell times as required to dry the fabric and the foam. During the drying, water is removed from the fabric and the foam. Also, the plasticizer added to the latex mixes with the polymer particles which flow together to form a film. Ordinarily, drying is continued until the foam and the fabric have a moisture content below normal regain, although they need not be absolutely dry.

Next the foam is crushed. Conveniently this is accomplished by passing the fabric between rolls which apply a pressure of about 10 to about 100 p.s.i., preferably about 20–60 p.s.i. The degree of compression should be sufficient that the foam will not be further compressed to a significant degree in ordinary handling, sewing, etc.

Next the foam is heated, very quickly, to set the foam in the crushed configuration. No very substantial heating is required. For example, using infrared heaters to raise the surface of the foam to 300°–350° F., a 10-second dwell time is sufficient. Passing the fabric over rotating steam-heated drums at 225° F., a total contact time of say a minute also is sufficient. The foam is heated above the second order transition temperature of the plasticized polymer and sufficiently to cause the polymer to flow a little. However, it should not be significantly softened.

If desired, a thin coating can then be applied to the foam to prevent any residual tackiness, avoid blocking, etc. This avoids sticking not only at ordinary temperatures but at elevated temperatures encountered during laundering, etc. Typical antiblock agents include waxes, salts of long chain fatty acids and polymer such as polyamides, polyethylene, silicones and fluocarbons.

The following examples illustrates the practice of the invention:

EXAMPLE 1

The following latex was prepared.

| Chemical | Dry Parts | Wet Parts | % Solids |
|---|---|---|---|
| Vinyl Chloride polymer Latex* | 100.0 | 178.0 | 56 |
| Tri Cresyl Phosphate | 16.8 | 16.8 | 100 |
| Polyethylene Glycol 2-ethylhexoate | 22.4 | 22.4 | 100 |
| Water | | 61.3 | |
| Potassium Stearate | 6.8 | 34.0 | 20 |
| Titanium Dioxide | 44.8 | 44.8 | 100 |
| Antimony Oxide | 16.8 | 16.8 | 100 |
| Sodium Polyacrylate | 0.1 | 1.0 | 10 |
| Sodium Lauryl Sulfate ≠ | Trace | Trace | 100 |
| Glycerin ≠ | Trace | Trace | 100 |

*Vinyl Chloride polymer preplasticized with 35% by weight doctyl phthalate.

≠ added to prevent the foam from drying before applied to a fabric.

The latex had the following characteristics: solids 55.2 percent, viscosity 1360 c.p.s. (Brookfield 02 20 r.p.m. pH 9.7. This latex was foamed in Oakes continuous mixer to a foam density of 0.110 gm./cc. The foam was applied to a woven glass fiber fabric having the following characteristics:

| Type glass | "E" | | |
|---|---|---|---|
| Warp yarn | ECDE | 300 | 1/0 l–Z |
| Fill yarn | OC | 401 | (DE–75) |
| Weight | 4.8 | | ounces per square yard |
| Thickness | 0.011 | | inch |

The foam was applied under a knife set for a gap of 0.051 inch. Next, the fabric was heated in an oven maintained at 295° F., the dwell time being about 1 minute. Then the foam is crushed by passing the coated fabric between rolls applying 30 lbs. per square inch pressure. Finally, the foam is heated to conform to the crushed configuration by passing over six 30-inch steam cans heated internally to 225° F. and rotating at 5.5 r.p.m.

Two layers of antiblock coating were applied from aqueous media, the first after crushing and the second after the final heating. The second coat was dried by passing very quickly under a gas fired infrared heater.

The coated fabric had a weight of 6.9 ounces per square yard, a scratch resistance of 375 g. and a thickness of 0.015 inch. Flammability was tested with Owens Corning test OCF-DF-519 and was found acceptable.

In the following example, antimony oxide and part of the $TiO_2$ were replaced with Kaolin and a different high molecular weight plasticizer was used.

EXAMPLE 2

A coating composition containing the following was prepared.

| Chemical | Dry Parts | Wet Parts | % Solids |
|---|---|---|---|
| Vinyl Chloride polymer latex as in Example 1 | 100 | 178 | 56 |
| Tri Cresyl Phosphate | 10 | 10 | 100 |
| High Molecular Weight Polyester Plasticizer | 10 | 10 | 100 |
| Water | | 50 | |
| Potassium Stearate | 4 | 20 | 20 |
| Titanium Dioxide | 30 | 30 | 100 |
| Kaolin | 30 | 30 | 100 |
| Sodium Polyacrylate | 0.2 | 2 | 10 |

The latex had the following properties:

| | |
|---|---|
| Solids | 56.6% |
| Viscosity | 1,680 c.p.s. (Brookfield No. 2, 20 r.p.m) |
| pH | 8-8.5 |

This latex was formed in an Oakes continuous foamer to a foam density of 0.110 g./cc. and applied to a glass fabric having a weight of 4.3 oz./yd.$^2$ and a thickness of 0.0088 inches, the knife gap being 0.040 inch. The fabric was dried in an oven maintained at 340° F. with a dwell time of about 1 minute. Then it was crushed as in example 1 and reheated, using infrared heaters radiating onto the foam to give a surface temperature of 310°-330° F., heating being for about 10 seconds. The fabric had somewhat less satisfactory hand than in example 1 and a scratch resistance of 325 g. The finished thickness was 0.012 inch.

It will be appreciated that these examples are provided for purposes of illustrating the invention and that no limitation thereto is intended.

In making drapes from finished goods according to this invention, the procedure used may be that described in Farrell U.S. Pat. No. 3,399,714 especially with respect to FIGS. 6-13 thereof. Briefly, a continuous length of the finished drapery fabric is taken from its roll or other package and is continuously folded and then sewed with a hem, first along one side edge and then along the other side edge, or along both side edges simultaneously. The hemmed length is then cut transversely into predetermined shorter lengths, each of which will be converted subsequently into a drapery panel. The cut segments allow sufficient material for top and bottom hems so that, after folding and hemming, the finished drape will be of the desired length. The cutting operation may be performed automatically as the fabric is run out of the hemming operation, or it may be performed subsequently on a batch basis.

Next, the lower edge portion of the cut drapery length is accurately creased so as to form two transverse fold lines preparatory to forming a bottom hem. One fold line may be two inches above the bottom edge, and the next fold line may be four inches above the 2-inch fold line. The creasing operation is carried out by suitable equipment adapted to perform this function. The 2-inch fold hides the cut edge, and the 4-inch fold provides a neat hem, with sufficient fabric to permit any subsequent consumer adjustment.

Each hem is transversely machine or hand stitched. The previously mentioned creasing operation facilitates the folding steps so that the hems can be formed rapidly and accurately.

Next, a strip of stiffening material such as buckram binding, but preferably a stiffened glass fabric, may be secured to the top edge of the cut drapery length. This is accomplished by first placing the lower edge portion of the buckram of other strip over the upper edge portion of the cut drapery length and stitching the two layers together. The buckram strip is then folded along its lower edge so as to place the previously exposed surface of the buckram strip against the drapery fabric.

The cut drapery length is then turned over, and the top hem, defined by the buckram or other stiffening strip and a portion of the drapery fabric, can be pleated in any convenient manner. Commercially, this may be done by first feeding the top hem portion into an automatic pleat crimping apparatus which presses a plurality of spaced-apart, three-fold pleats into the heading, followed by sewing to hold the pleats, or by sewing and "fastening" as in the aforesaid Farrell patent, using the pleat retainer thereof. Typically, the folds of the finished pleat are not sewed, inasmuch as this would flatten the outermost pleat portions and render them immobile. Style and fashion currently demand a folded but not a flattened appearance.

What is claimed is:

1. A process for manufacturing a foam-laminated fabric useful for draperies, slipcovers, upholsteries, tablecloths, wallcovering and the like, comprising:
   forming on one side of a glass fabric a layer of foamed latex containing vinyl chloride polymer, plasticizers for said polymer including a flame-retardant phosphate ester and polyethylene glycol bis 2-ethyl-hexoate,
   drying said fabric and said latex,
   compressing the resulting laminate, and
   heating the compressed fabric briefly to set the foam in its compressed configuration.

2. A process as set forth in claim 1 in which said phosphate ester is a tri-cresyl phosphate.

3. A process as set forth in claim 1 in which said latex also contains a filler.

4. A process as set forth in claim 3 in which said filler comprises titanium dioxide.

5. A process as set forth in claim 1 in which said latex is dried below the normal equilibrium moisture content.

6. A process as set forth in claim 1 in which the heating of the compressed fabric raises the temperature of the foam layer above the second order transition temperature and the polymer flows.

7. A process for manufacturing a foam-laminated fabric useful for draperies, slipcovers, upholsteries, tablecloths, wallcovering and the like, comprising:
   forming on one side of a glass fabric a layer of foamed latex containing vinyl chloride polymer, plasticizers for said polymer including a flame retardant phosphate ester, and a filler for said polymer comprising titanium dioxide and antimony oxide,
   drying said fabric and said latex,
   compressing the resulting laminate, and
   heating the compressed fabric briefly to set the foam in its compressed configuration.

8. A process for manufacturing a foam-laminated fabric useful for draperies, slipcovers, upholsteries, tablecloths, wallcovering and the like, comprising:
   forming on one side of a glass fabric a layer of foamed latex containing vinyl chloride polymer, plasticizers for said polymer including a flame retardant phosphate ester and polyethylene glycol bis-2-ethyl-hexoate, and a filler for said polymer comprising titanium dioxide and antimony oxide, drying said latex to below its normal equilibrium water content,
compressing the resulting laminate, and heating the compressed fabric briefly to set the foam in its compressed configuration.

* * * * *